(12) United States Patent
Zhu et al.

(10) Patent No.: US 11,361,453 B2
(45) Date of Patent: Jun. 14, 2022

(54) METHOD AND APPARATUS FOR DETECTING AND TRACKING TARGET, ELECTRONIC DEVICE AND STORAGE MEDIA

(71) Applicant: APOLLO INTELLIGENT CONNECTIVITY (BEIJING) TECHNOLOGY CO., LTD., Beijing (CN)

(72) Inventors: Xiaoxing Zhu, Beijing (CN); Yongyi Sun, Beijing (CN); Chengfa Wang, Beijing (CN)

(73) Assignee: APOLLO INTELLIGENT CONNECTIVITY (BEIJING) TECHNOLOGY CO., LTD., Beijing (CN)

( * ) Notice: Subject to any disclaimer, the term of this patent is extended or adjusted under 35 U.S.C. 154(b) by 0 days.

(21) Appl. No.: 16/916,317

(22) Filed: Jun. 30, 2020

(65) Prior Publication Data

US 2021/0125353 A1    Apr. 29, 2021

(30) Foreign Application Priority Data

Oct. 25, 2019   (CN) .......................... 201911025501.4

(51) Int. Cl.
*G06T 7/292*   (2017.01)
*H04L 47/125*   (2022.01)
(Continued)

(52) U.S. Cl.
CPC ........ *G06T 7/292* (2017.01); *G08B 13/19641* (2013.01); *G08B 13/19645* (2013.01);
(Continued)

(58) Field of Classification Search
CPC . G06T 7/292; H04L 47/125; G08B 13/19641; G08B 13/19645
See application file for complete search history.

(56) References Cited

U.S. PATENT DOCUMENTS 9,251,598 B2 *   2/2016   Wells ...................... G06T 7/292
10,127,438 B1 *  11/2018   Fisher ..................... G06N 3/04
(Continued)

FOREIGN PATENT DOCUMENTS

| CN | 108985162 | 12/2018 |
|----|-----------|---------|
| CN | 109559330 | 4/2019  |

(Continued)

OTHER PUBLICATIONS

Extended Search Report issued by the European Patent Office, dated Jan. 12, 2021, for European Patent Application No. 20184260.6; 9 pages.

(Continued)

*Primary Examiner* — David N Werner
(74) *Attorney, Agent, or Firm* — Faegre Drinker Biddle & Reath LLP

(57) ABSTRACT

A method and apparatus for detecting and tracking a target, an electronic device and a storage medium are provided. The method includes: cameras, detection modules, tracking modules and storage queues are provided in advance; the numbers of cameras, storage queues and tracking modules are equal, and there is a one-to-one correspondence between the cameras and the storage queues and between the cameras and the tracking modules; distributing data streams collected by the cameras to the plurality of detection modules; detecting, by the detection modules, the received data streams, and sending detection results of the data streams collected by the cameras, to the storage queues corresponding to the cameras; and extracting, by the tracking modules corresponding to the cameras, the detection results from the storage queues (Continued)

corresponding to the cameras, and using the detection results for tracking the target.

18 Claims, 3 Drawing Sheets

(51) Int. Cl.
*H04N 5/247* (2006.01)
*H04N 7/025* (2006.01)
*H04N 7/08* (2006.01)
*G08B 13/196* (2006.01)

(52) U.S. Cl.
CPC ........... *H04L 47/125* (2013.01); *H04N 5/247* (2013.01); *H04N 7/025* (2013.01); *H04N 7/08* (2013.01)

(56) References Cited

U.S. PATENT DOCUMENTS

| | | | | |
|---|---|---|---|---|
| 10,878,585 | B1* | 12/2020 | Boulio | ................... H04N 5/247 |
| 2007/0237357 | A1* | 10/2007 | Low | ........................ G01S 3/781 |
| | | | | 382/103 |
| 2007/0279494 | A1* | 12/2007 | Aman | ................ H04N 5/23238 |
| | | | | 348/169 |
| 2010/0157064 | A1* | 6/2010 | Cheng | .................... G06V 20/52 |
| | | | | 348/169 |
| 2014/0140572 | A1 | 5/2014 | Ranjan et al. | |
| 2017/0272625 | A1* | 9/2017 | Gravis | ............. G08B 13/19632 |
| 2018/0225840 | A1* | 8/2018 | Ikeda | ................. G06K 9/00335 |
| 2018/0343442 | A1* | 11/2018 | Yoshikawa | ...... G08B 13/19641 |
| 2019/0043207 | A1 | 2/2019 | Carranza | |
| 2019/0082105 | A1* | 3/2019 | Yamamoto | ............ G06T 3/4038 |
| 2019/0154872 | A1* | 5/2019 | Leduc | ...................... G06N 3/08 |
| 2019/0197707 | A1* | 6/2019 | Trolat | ................ G06K 9/00986 |
| 2019/0294889 | A1* | 9/2019 | Sriram | ................. G06K 9/6274 |
| 2019/0340767 | A1* | 11/2019 | Koh | ....................... G06V 20/52 |
| 2019/0362508 | A1* | 11/2019 | Anantha | ........... H04W 72/0433 |
| 2020/0111221 | A1* | 4/2020 | Moriyama | ............... H04N 5/74 |
| 2020/0184230 | A1* | 6/2020 | Liu | .................... G06K 9/00342 |

FOREIGN PATENT DOCUMENTS

| | | |
|---|---|---|
| GN | 109447121 A | 3/2019 |
| JP | H11175485 A | 7/1999 |
| JP | 2002318790 A | 10/2002 |
| JP | 2004280348 A | 10/2004 |
| JP | 2012103879 A | 5/2012 |
| JP | 2013206140 A | 10/2013 |
| JP | 2015064778 A | 4/2015 |
| JP | 2015114917 A | 6/2015 |
| JP | 2016071830 A | 5/2016 |

OTHER PUBLICATIONS

Zhang Haitao, et al., "Efficient Online Surveillance Video Processing Based on Spark Framework", Jul. 19, 2016, Big Data Analytics in the Social and Ubiquitous Context: 5th International Workshop on Modeling Social Media, MSM 2014, 5th International Workshop on Mining Ubiquitous and Social Environments, Muse 2014 and First International Workshop on Machine LE; 10 pages.
Aakash Khochare, et al., "A Scalable Platform for Distributed Object Tracking across a Many-camera Network", ARXIV.org, Cornell University Library, Feb. 14, 2019; 40 pages.
The State Intellectual Property Office of People's Rebulic of China; Chinese Search Report Chinese Application No. 201911025501.4; dated Dec. 13, 2021; 3 pages.
The State Intellectual Property Office of People's Rebulic of China; Chinese Office Action Chinese Application No. 201911025501.4; dated Dec. 13, 2021; 11 pages.
Japanese Patent Office; Decision to Grant a Patent; Japanese Application No. 2020-105772; dated Jul. 1, 2021; 5 pages.

* cited by examiner

METHOD AND APPARATUS FOR DETECTING AND TRACKING TARGET, ELECTRONIC DEVICE AND STORAGE MEDIA

CROSS-REFERENCE TO RELATED APPLICATION

This application claims priority to Chinese Patent Application No. 201911025501.4, filed on Oct. 25, 2019, which is hereby incorporated by reference in its entirety.

TECHNICAL FIELD

The present application relates to the field of intelligent transportation, and in particular, to a method and apparatus for detecting and tracking a target, an electronic device and a storage media.

BACKGROUND

In target detection and tracking technology, the purpose of detection is to identify a target in a video frame, and the purpose of tracking is to determine the matching relationship between the target in the previous frame and the target in the next frame, so as to determine the tracking trajectory of the target. Detection and tracking together constitute sensing of the target.

SUMMARY

In a first aspect, a method for detecting and tracking a target is provided according to an embodiment of the application, wherein a plurality of cameras, a plurality of detection modules, a plurality of tracking modules and a plurality of storage queues are provided in advance; the numbers of cameras, storage queues and tracking modules are equal, and there is a one-to-one correspondence between the cameras and the storage queues and between the cameras and the tracking modules; and the method includes:
distributing data streams collected by the cameras to the plurality of detection modules;
detecting, by the detection modules, the received data streams, and sending detection results of the data streams collected by the cameras, to the storage queues corresponding to the cameras; and
extracting, by the tracking modules corresponding to the cameras, the detection results from the storage queues corresponding to the cameras, and using the detection results for tracking the target.

In the embodiment of the application, the detection modules and the tracking modules are decoupled, the data streams collected by the cameras are distributed to the detection modules for detection, and the detection results are sent to the storage queues corresponding to the cameras, which are extracted by the tracking modules corresponding to the cameras and used for target recognition, so as to transform the existing serial processing mode into a pipelined asynchronous implementation mode. In this way, the detection and tracking processing time is reduced.

In an embodiment, the distributing data streams collected by the cameras to the plurality of detection modules, includes:
distributing the data streams collected by the cameras to the plurality of detection modules, in a load balancing manner.

In the embodiment of the application, the data streams are distributed to the detection modules in the load balancing manner, so as to improve the detection speed as much as possible.

In an embodiment, the storage queue includes a storage middleware.

In a second aspect, an apparatus for detecting and tracking a target is provided according to an embodiment of the application, which includes: a distribution module, a plurality of cameras, a plurality of detection modules, a plurality of tracking modules and a plurality of storage queues; the numbers of cameras, storage queues and tracking modules are equal, and there is a one-to-one correspondence between the cameras and the storage queues and between the cameras and the tracking modules, wherein:
the cameras are configured to collect data streams;
the distribution module is configured to distribute the data streams collected by the cameras to the plurality of detection modules;
the detection modules are configured to detect the received data streams, and send detection results of the data streams collected by the cameras, to the storage queues corresponding to the cameras;
the storage queues are configured to store the detection results of the data streams collected by the corresponding cameras; and;
the tracking modules are configured to extract the detection results from the storage queues corresponding to the cameras, and use the detection results for tracking the target.

In an embodiment, the distribution module is configured to distribute the data streams collected by the cameras to the plurality of detection modules, in a load balancing manner.

In an embodiment, the storage queue includes a storage middleware.

In a third aspect, an electronic device is provided according to an embodiment of the present application, which includes:
at least a processor; and
a memory communicatively connected to at least one processor, wherein,
the memory stores instructions executable by the at least one processor, and the instructions, when executed by the at least one processor, cause the at least one processor to implement the method of any one of the embodiments in the first aspect.

In the fourth aspect, a non-transitory computer readable storage medium storing computer instructions is provided according to an embodiment of the application, wherein the computer instructions, when executed by a computer, causes the computer to implement the method of any one of the embodiments in the first aspect.

One embodiment of the above application has the following advantages or beneficial effects: in the embodiment of the application, the detection modules and the tracking modules are decoupled, and the data streams collected by the cameras are distributed to the detection modules for detection in a distributed manner; the detection results of the data streams are sent to the storage queues corresponding to the cameras, and the tracking modules corresponding to the cameras perform the extraction and target recognition, so that the existing serial processing mode can be transformed into a pipeline asynchronous implementation mode, which reduces the processing time of detection and tracking.

Other effects of the above alternative will be described below in combination with specific embodiments.

BRIEF DESCRIPTION OF THE DRAWINGS

The attached drawings are used for a better understanding of the solution and do not constitute a limitation on the application, wherein.

DETAILED DESCRIPTION

The exemplary embodiments of the present application will be described below in combination with the drawings, including various details of the embodiments of the present application to facilitate understanding, which should be considered only exemplary. Therefore, those ordinary skilled in the art should realize that various changes and modifications can be made to the embodiments described herein without departing from the scope and spirit of the present application. Similarly, for clarity and simplicity, the following description omits the description of the known functions and structures.

In the existing technology, a detection module and a tracking module are usually bound, that is, a sensing module includes a detection module and a tracking module. When multiple cameras are provided at multiple intersections to collect data streams for sensing a target, there is a one-to-one correspondence between cameras and sensing modules; a data stream collected by a camera is sent to the corresponding sensing module, and the detection module in the sensing module detects the data stream and inputs the detection result into the tracking module; the tracking module then uses the detection result to track the target. Because the tracking module could process the detection result only after the detection module obtains it, this serial processing method takes a long time.

A method for detecting and tracking a target is provided according to an embodiment of the present application, which includes: a plurality of cameras, a plurality of detection modules, a plurality of tracking modules and a plurality of storage queues are provided in advance; the numbers of cameras, storage queues and tracking modules are equal, and there is a one-to-one correspondence between the cameras and the storage queues and between the cameras and the tracking modules.

Figure 1:
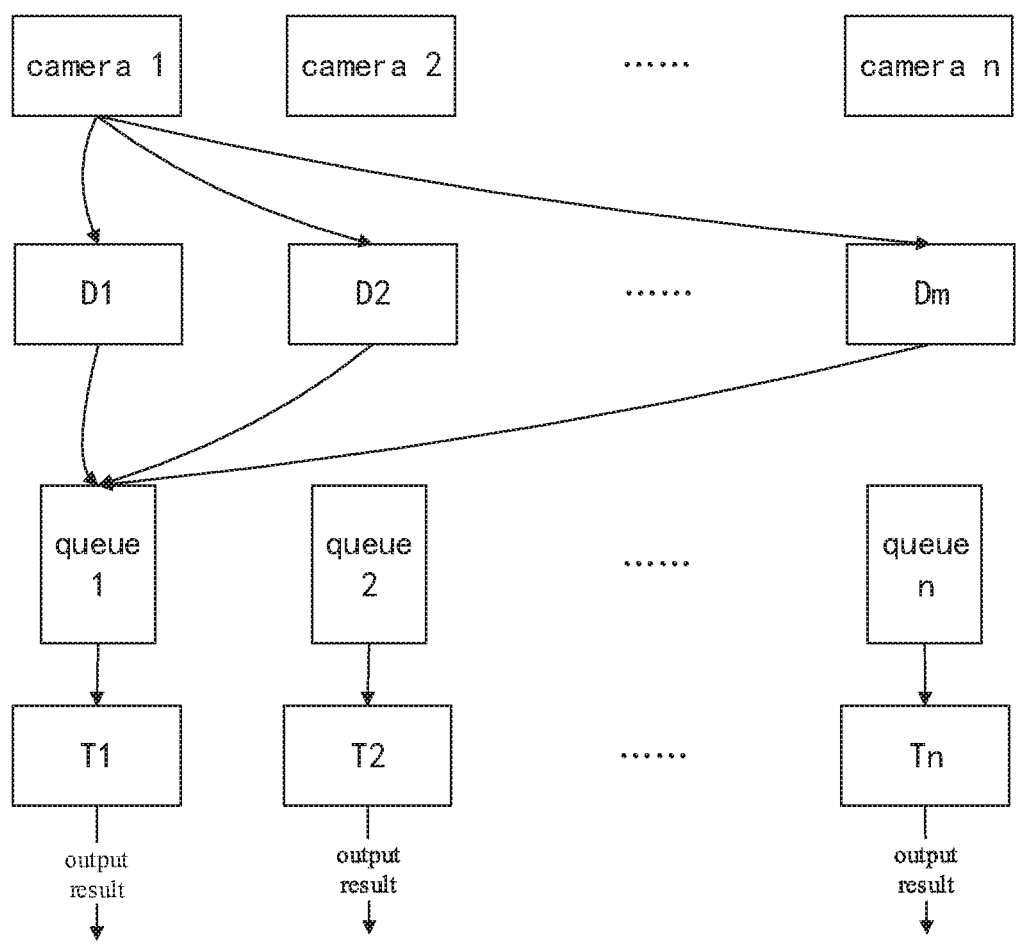
FIG. 1 is a schematic diagram of module setting in a method for detecting and tracking a target according to an embodiment of the application.

FIG. 1 is a schematic diagram of module setting in a method for detecting and tracking a target according to an embodiment of the application. As shown in FIG. 1, n cameras are provided at multiple intersections, i.e. camera 1, camera 2 . . . camera n, and m detection modules are provided, i.e. D1, D2 . . . Dm, wherein n may be equal or not equal to n. There is a one-to-one correspondence between the cameras and the storage queues and between the cameras and the tracking modules. In FIG. 1, there are n storage queues, i.e. queue 1, queue 2 . . . queue n, and there are n tracking modules, i.e. T1, T2, . . . Tn. Camera 1 corresponds to queue 1 and tracking module T1, camera 2 corresponds to queue 2 and tracking module T2, . . . camera n corresponds to queue n and tracking module Tn.

As shown in FIG. 1, a data stream collected by each camera may be distributed to multiple different detection modules. For example, a data stream collected by camera 1 can be distributed to detection modules D1, D2 . . . Dm. Each detection module processes part of the data stream from camera 1, and sends a detection result to queue 1 corresponding to camera 1. The tracking module T1 corresponding to camera 1 can read detection results from queue 1, and use the read detection results for target tracking. For clarity, only the data stream collected by camera 1 and the input and output directions of the processing results thereof are shown in FIG. 1. The situations of other cameras are similar to this.

Figure 2:
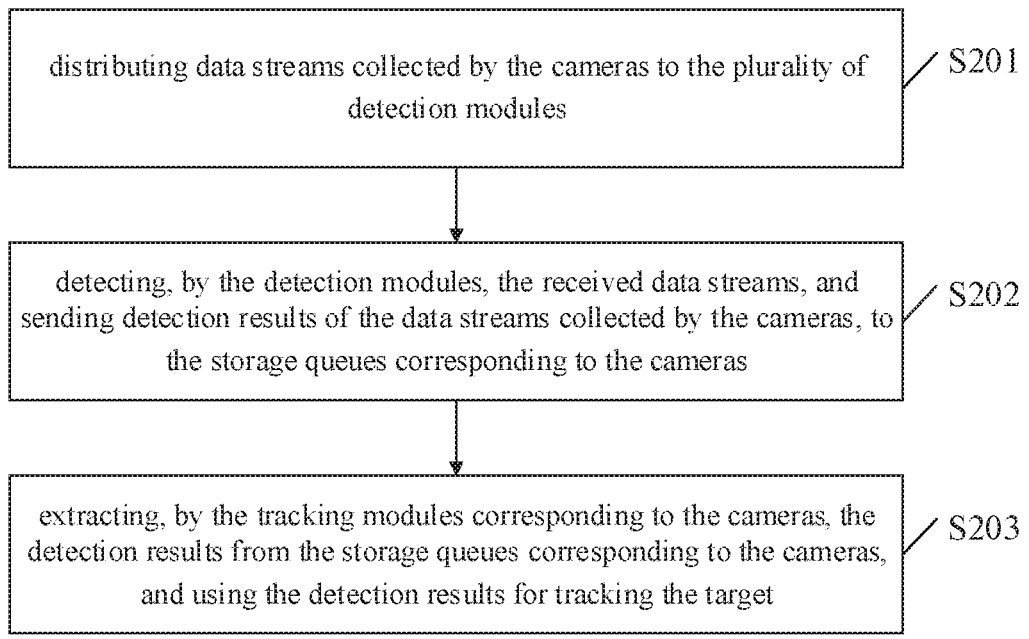
FIG. 2 is a schematic flowchart of an implementation of a method for detecting and tracking a target according to an embodiment of the present application.

FIG. 2 is a schematic flowchart of an implementation of a method for detecting and tracking a target according to an embodiment of the present application, which includes:

S201, distributing data streams collected by the cameras to the plurality of detection modules;

S202, detecting, by the detection modules, the received data streams, and sending detection results of the data streams collected by the cameras, to the storage queues corresponding to the cameras; and S203, extracting, by the tracking modules corresponding to the cameras, the detection results from the storage queues corresponding to the cameras, and using the detection results for tracking the target.

In a possible embodiment, S201 may include: distributing the data streams collected by the cameras to the plurality of detection modules, in a load balancing manner.

In a possible embodiment, the storage queue includes a storage middleware, such as a Kafka storage middleware.

In a possible embodiment, an identification of a camera may be added to a data stream collected by the camera, so that a detection module can determine which camera the received data stream is from, and send a detection result to a storage queue corresponding to the camera.

Specifically, the above S201 may include: adding identifications of the cameras to the data streams; and distributing the data streams containing the identifications of the cameras, to the plurality of detection modules, wherein the cameras refers to cameras that collect the data streams.

The sending detection results of the data streams collected by the cameras, to the storage queues corresponding to the cameras in above S202 may include: determining the corresponding cameras according to the identifications of the cameras contained in the data streams; and sending the detection results of the data streams collected by the cameras, to the storage queues corresponding to the determined cameras.

As can be seen from the above embodiments, in the embodiments of the application, the detection modules and the tracking modules are decoupled. The data streams collected by the cameras are distributed to the detection modules for detection in a distributed manner. The detection results are sent to the storage queues corresponding to the cameras, which are extracted by the tracking modules corresponding to the cameras and used for target recognition, so as to transform the existing serial processing mode into a pipelined asynchronous implementation mode. In this way, the detection and tracking processing time is reduced. For example, assuming that the processing time of the detection module for a frame of image is A and the processing time of the tracking module for a frame of image is B, the processing time of the whole sensing module is A+B in the way of the existing technology; while in the way proposed in the embodiments of the application, the processing time of the whole sensing module can be reduced to max (A, B).

Figure 3:
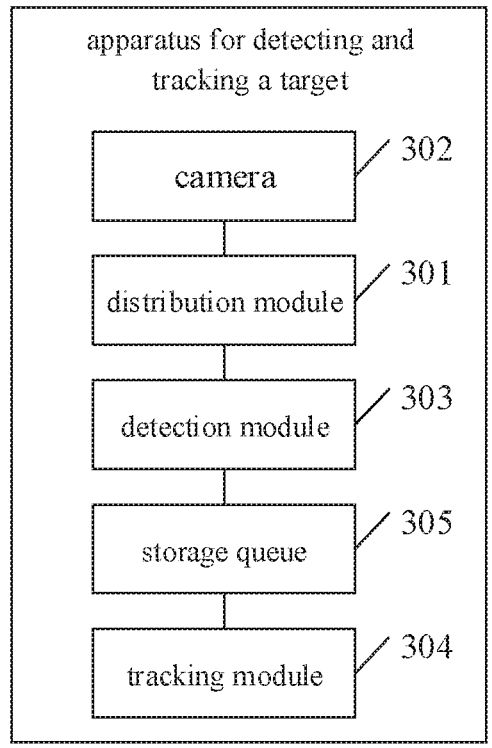
FIG. 3 is a schematic structural diagram of an apparatus for detecting and tracking a target according to an embodiment of the application.

An apparatus for detecting and tracking a target is provided according to an embodiment of the present application. FIG. 3 is a schematic structural diagram of an apparatus for detecting and tracking a target according to an embodiment of the application, which includes: a distribution module 301, a plurality of cameras 302, a plurality of detection modules 303, a plurality of tracking modules 304 and a plurality of storage queues 305; the numbers of cameras 302, storage queues 305 and tracking modules 304 are equal, and there is a one-to-one correspondence between the cameras 302 and the storage queues 305 and between the cameras 302 and the tracking modules 304.

The cameras 302 are configured to collect data streams.

The distribution module 301 is configured to distribute the data streams collected by the cameras 302 to the plurality of detection modules 303.

The detection modules 303 are configured to detect the received data streams, and send detection results of the data streams collected by the cameras 302, to the storage queues 305 corresponding to the cameras 302.

The storage queues 305 are configured to store the detection results of the data streams collected by the corresponding cameras 302.

The tracking modules 304 are configured to extract the detection results from the storage queues 305 corresponding to the cameras, and use the detection results for tracking the target.

In a possible embodiment, the distribution module 301 is configured to distribute the data streams collected by the cameras to the plurality of detection modules, in a load balancing manner.

In a possible embodiment, the storage queue includes a storage middleware, such as a Kafka middleware.

In a possible embodiment, the distribution module 301 is configured to add identifications of the cameras to the data streams, and distribute the data streams containing the identifications of the cameras, to the plurality of detection modules; and the detection module 303 is configured to determine the corresponding cameras according to the identifications of the cameras contained in the data streams, and send the detection results of the data streams collected by the cameras, to the storage queues corresponding to the determined cameras.

The functions of modules in each apparatus of the embodiments of the application may refer to the corresponding description in the above method, and will not be described here.

As can be seen from the above embodiments, the apparatus according to the embodiments of the application decouples the detection modules and the tracking modules, and distributes the data streams collected by the cameras to the detection modules for detection. This distributed processing mode enables the detection modules to share the detection pressure and improve the detection speed. After the processing of the detection modules is completed, the detection results are sent to the storage queues corresponding to the cameras; the detection results are extracted by the tracking modules corresponding to the cameras, and the detection results are used for target recognition, so that the existing serial processing mode can be transformed into a pipeline asynchronous implementation mode, which reduces the processing time of detection and tracking.

An electronic device and a readable storage medium are further provided according to embodiments of the present application.

Figure 4:
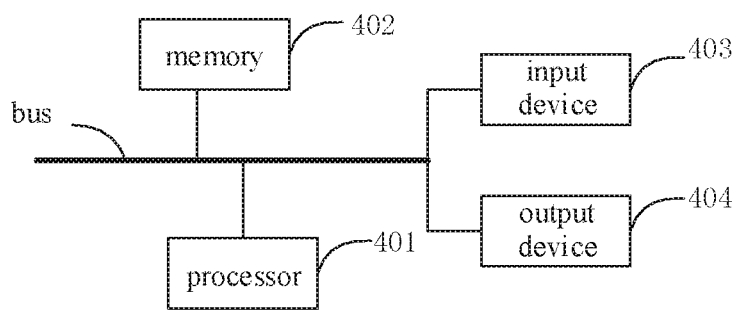
FIG. 4 is a block diagram of an electronic device for implementing a method for detecting and tracking a target according to an embodiment of the present application.

FIG. 4 shows a block diagram of an electronic device for implementing a method for detecting and tracking a target according to an embodiment of the present application. Electronic devices are intended to represent various forms of digital computers, such as laptop computers, desktop computers, workbenches, personal digital assistants, servers, blade servers, mainframe computers, and other suitable computers. Electronic devices can also represent various forms of mobile devices, such as personal digital processing, cellular phones, smart phones, wearable devices, and other similar computing devices. The components shown here, their connections and relationships, and their functions are merely examples, and are not intended to limit the implementation of the application described and/or required herein.

As shown in FIG. 4, the electronic device includes: one or more processors 401, a memory 402, and interfaces for connecting various components, including a high-speed interface and a low-speed interface. The various components are interconnected with different buses and can be mounted on a public mainboard or otherwise installed as required. The processor can process instructions executable within the electronic device, including instructions storing in or on a memory for displaying graphic information of a graphical user interface (GUI) on an external input/output device (such as a display device coupled to the interface). In other embodiments, multiple processors and/or multiple buses can be used with multiple memories, if desired. Similarly, multiple electronic devices can be connected, each providing some of the necessary operations (for example, as a server array, a group of blade servers, or a multiprocessor system). A processor 401 is taken as an example in FIG. 4.

The memory 402 is a non-transitory computer readable storage medium according to an embodiment of the present application. The memory stores instructions executable by at least one processor, and the instructions, when executed by the at least one processor, cause the at least one processor to implement the method according to the above embodiments of the present application. The non-transitory computer-readable storage medium of the present application stores computer instructions, wherein the computer instructions, when executed by a computer, cause the computer to implement the method according to the above embodiments of the present application.

As a non-transitory computer readable storage medium, the memory 402 may be used to store non-transitory software programs, non-transitory computer executable programs and modules, such as program instructions/modules corresponding to the method in the embodiments of the present application (for example, the distribution module 301, the camera 302, the detection module 303, the tracking module 304 and the storage queue 305 shown in FIG. 3). The processor 401 executes various functional applications and data processing of the server by running non-transitory software programs, instructions, and modules stored in the memory 402, that is, the method according to the above embodiments of the present application can be implemented.

The memory 402 can include a storage program area and a storage data area, where the storage program area may store an operating system and applications required for at least one function; the storage data area may store the data created according to the use of the electronic device for detecting and tracking a target, etc. In addition, the memory 402 may include a high-speed random access memory, and may also include a non-transitory memory, such as at least one magnetic disk storage device, a flash memory device, or other non-transitory solid-state storage device. In some embodiments, the memory 402 may alternatively include a memory remotely set relative to the processor 401, and these remote memories can be connected to the electronic device for detecting and tracking a target through a network. Examples of the above network include, but are not limited to, the Internet, an intranet, a local area network, a mobile communication network, and combinations thereof.

The electronic device may further include an input device 403 and an output device 404. The processor 401, the memory 402, the input device 403, and the output device 404 may be connected through a bus or in other manners. In FIG. 4, the connection through the bus is taken as an example.

The input device 403 may receive inputted numeric or character information, and generate key signal inputs related to user settings and function control of the electronic device for detecting and tracking a target, such as a touch screen, a keypad, a mouse, a trackpad, a touchpad, a pointing stick, one or multiple mouse buttons, trackballs, joysticks and other input devices. The output device 404 may include a display device, an auxiliary lighting device (for example, an LED), a haptic feedback device (for example, a vibration motor), and the like. The display device can include, but is not limited to, a liquid crystal display (LCD), a light emitting diode (LED) display, and a plasma display. In some embodiments, the display device can be a touch screen.

Various implementations of the system and technology described herein can be implemented in a digital electronic circuit system, an integrated circuit system, an application specific integrated circuits (ASIC), a computer hardware, a firmware, a software, and/or a combination thereof. These various implementations may include: implementation in one or more computer programs executable on and/or interpretable on a programmable system including at least one programmable processor, which may be a dedicated or general-purpose programmable processor that may receive data and instructions from a storage system, at least one input device, and at least one output device, and transmit the data and instructions to the storage system, the at least one input device, and the at least one output device.

These computing programs (also known as programs, softwares, software applications, or codes) include machine instructions of a programmable processor and can be implemented using high-level procedural and/or object-oriented programming languages, and/or assembly/machine languages. As used herein, the terms "machine-readable medium" and "computer-readable medium" refer to any computer program product, apparatus, and/or device used to provide machine instructions and/or data to a programmable processor (for example, a magnetic disk, an optical disk, a memory, and a programmable logic device (PLD)), including machine-readable media that receives machine instructions as machine-readable signals. The term "machine-readable signal" refers to any signal used to provide machine instructions and/or data to a programmable processor.

In order to provide interaction with the user, the system and technique described herein may be implemented on a computer having a display device (for example, a Cathode Ray Tube (CRT) or liquid crystal display (LCD) monitor) for displaying information to the user; and a keyboard and pointing device (such as a mouse or trackball) through which the user can provide input to a computer. Other kinds of devices may also be used to provide interaction with the user; for example, the feedback provided to the user may be any form of sensory feedback (for example, visual feedback, auditory feedback, or haptic feedback); and may be in any form (including acoustic input, voice input, or tactile input) to receive input from the user.

The system and technology described herein can be implemented in a computing system including background components (for example, as a data server), or a computing system including middleware components (for example, an application server), or a computing system including front-end components (for example, a user computer with a graphical user interface or a web browser, through which the user can interact with the implementation of the system and technology described herein), or a computing system including any combination of such background components, middleware components, and front-end components. The components of the system may be interconnected by any form or medium of digital data communication (for example, a communication network). Examples of the communication network include: a local area network (LAN), a wide area network (WAN), and the Internet.

The computer system may include a client and a server. The client and server are generally remote from each other and typically interact through a communication network. A client-server relationship is generated by computer programs running on the respective computers and having the client-server relationship with each other.

According to the solution of the embodiments of the application, the detection modules and the tracking modules are decoupled. The data streams collected by the cameras are distributed to the detection modules for detection in a distributed manner; the detection results of the data streams are sent to the storage queues corresponding to the cameras, and the tracking modules corresponding to the cameras perform the extraction and target recognition, so that the existing serial processing mode can be transformed into a pipeline asynchronous implementation mode, which reduces the processing time of detection and tracking.

It should be understood that the various forms of processes shown above can be used to reorder, add, or delete steps. For example, the steps described in this application can be executed in parallel, sequentially, or in different orders. As long as the desired results of the technical solutions disclosed in this application can be achieved, there is no limitation herein.

The foregoing specific implementations do not constitute a limitation on the protection scope of the present application. It should be understood by those skilled in the art that various modifications, combinations, sub-combinations, and substitutions may be made according to design requirements and other factors. Any modification, equivalent replacement and improvement made within the spirit and principle of this application shall be included in the protection scope of this application.

What is claimed is:

1. A method for detecting and tracking a target, comprises:
  collecting a plurality of data streams by a plurality of cameras;
  distributing a data stream collected by each of the plurality of cameras in parts to a plurality of different detection modules;
  detecting, by each of the plurality of different detection modules, a part of the data stream received by the detection module;
  sending, by each of the plurality of different detection modules, a detection result of the part, received by the detection module, of the data stream collected by the camera, to a storage queue corresponding to the camera; wherein the plurality of cameras corresponds to a plurality of storage queues;

extracting, by a tracking module corresponding to the camera, detection results of parts of the data stream from the storage queue corresponding to the camera; wherein the plurality of cameras correspond to a plurality of tracking modules; and using, by the tracking module, the detection results of the parts of the data stream for tracking the target;

wherein there is a one-to-one correspondence between the plurality of cameras and the plurality of storage queues and between the plurality of cameras and the plurality of tracking modules.

2. The method according to claim 1, wherein the distributing the data stream collected by each of the plurality of cameras in parts to the plurality of different detection modules, comprises:

distributing the data stream collected by each of the plurality of cameras in parts to the plurality of different detection modules, in a load balancing manner.

3. The method according to claim 1, wherein the storage queue comprises a storage middleware.

4. The method according to claim 2, wherein the storage queue comprises a storage middleware.

5. The method according to claim 1, wherein the distributing the data stream collected by each of the plurality of cameras in parts to the plurality of different detection modules, comprises:

adding an identification of the camera to the data stream;

distributing the data stream containing the identification of the camera in parts, to the plurality of different detection modules;

wherein the sending the detection result of the part, received by the detection module, of the data stream collected by the camera, to the storage queue corresponding to the camera, comprises:

determining the corresponding camera according to the identification of the camera contained in the data stream; and sending the detection result of the data stream collected by the camera, to the storage queue corresponding to the determined camera.

6. The method according to claim 2, wherein the distributing the data stream collected by each of the plurality of cameras in parts to the plurality of different detection modules, comprises:

adding an identification of the camera to the data stream;

distributing the data stream containing the identification of the camera in parts, to the plurality of different detection modules;

wherein the sending the detection result of the part, received by the detection module, of the data stream collected by the camera, to the storage queue corresponding to the camera, comprises:

determining the corresponding camera according to the identification of the camera contained in the data stream; and sending the detection result of the data stream collected by the camera, to the storage queue corresponding to the determined camera.

7. An apparatus for detecting and tracking a target, comprising:

a plurality of cameras for collecting a plurality of data streams;

a plurality of different detection modules;

at least a processor; and a memory communicatively connected to at least one processor, wherein the memory includes at least a plurality of storage queues, and there is a one-to-one correspondence between the plurality of cameras and the plurality of storage queues, wherein the memory stores instructions executable by the at least one processor, and the instructions, when executed by the at least one processor, cause the at least one processor to implement a plurality of tracking modules, and there is a one-to-one correspondence between the plurality of cameras and the plurality of tracking modules, and wherein the instructions, when executed by the at least one processor, cause the at least one processor to:

distribute a data stream collected by each of the plurality of cameras to in parts the plurality of different detection modules;

detect, by each of the plurality of different detection modules, a part of the data stream received by the detection module;

send, by each of the plurality of different detection modules, a detection result of the part, received by the detection module, of the data stream collected by the camera, to a storage queue corresponding to the camera;

extract, by a tracking module corresponding to the camera, detection results of parts of the data stream from the storage queue corresponding to the camera; and use, by the tracking module, the detection results of the parts of the data stream for tracking the target.

8. The apparatus according to claim 7, wherein the instructions, when executed by the at least one processor, cause the at least one processor further to: distribute the data stream collected by each of the plurality of cameras in parts to the plurality of different detection modules, in a load balancing manner.

9. The apparatus according to claim 7, wherein the storage queue comprises a storage middleware.

10. The apparatus according to claim 8, wherein the storage queue comprises a storage middleware.

11. The apparatus according to claim 7, wherein the instructions, when executed by the at least one processor, cause the at least one processor further to:

add an identification of the camera to the data stream;

distribute the data stream containing the identification of the camera in parts, to the plurality of different detection modules;

determine the corresponding camera according to the identification of the camera contained in the data stream; and send the detection result of the data stream collected by the camera, to the storage queue corresponding to the determined camera.

12. The apparatus according to claim 8, wherein the instructions, when executed by the at least one processor, cause the at least one processor further to:

add an identification of the camera to the data stream;

distribute the data stream containing the identification of the camera in parts, to the plurality of different detection modules;

determine the corresponding camera according to the identification of the camera contained in the data streams; and send the detection result of the data stream collected by the camera, to the storage queue corresponding to the determined camera.

13. A non-transitory computer readable storage medium storing computer instructions, wherein the computer instructions, when executed by a computer, cause the computer to:
collecting a plurality of data streams by a plurality of cameras;
distribute a data stream collected by each of the plurality of cameras in parts to a plurality of different detection modules;
detect, by each of the plurality of different detection modules, a part of the data stream received by the detection module;
send, by each of the plurality of different detection modules, a detection result of the part, received by the detection module, of the data stream collected by the camera, to a storage queue corresponding to the camera; wherein the plurality of cameras corresponds to a plurality of storage queues, wherein there is a one-to-one correspondence between the plurality of cameras and the plurality of storage queues;
extract, by a tracking module corresponding to the camera, detection results of parts of the data stream from the storage queue corresponding to the camera; wherein the plurality of cameras correspond to a plurality of tracking modules; and
use, by the tracking module, the detection results of the parts of the data stream for tracking the target, wherein there is a one-to-one correspondence between the plurality of cameras and the plurality of tracking modules.

14. The non-transitory computer readable storage medium according to claim 13, wherein the computer instructions, when executed by the computer, cause the computer further to: distribute the data stream collected by each of the plurality of cameras in parts to the plurality of different detection modules, in a load balancing manner.

15. The non-transitory computer readable storage medium according to claim 13, wherein the storage queue comprises a storage middleware.

16. The non-transitory computer readable storage medium according to claim 14, wherein the storage queue comprises a storage middleware.

17. The non-transitory computer readable storage medium according to claim 13, wherein the computer instructions, when executed by the computer, cause the computer further to:
add an identification of the camera to the data stream;
distribute the data stream containing the identification of the camera in parts, to the plurality of different detection modules;
determine the corresponding camera according to the identification of the camera contained in the data stream; and
send the detection result of the data stream collected by the camera, to the storage queue corresponding to the determined camera.

18. The non-transitory computer readable storage medium according to claim 14, wherein the computer instructions, when executed by the computer, cause the computer further to:
add an identification of the camera to the data stream;
distribute the data stream containing the identification of the camera in parts, to the plurality of different detection modules;
determine the corresponding camera according to the identification of the camera contained in the data stream; and
send the detection result of the data stream collected by the camera, to thestorage queue corresponding to the determined camera.

* * * * *